United States Patent
Marco et al.

(10) Patent No.: US 10,022,015 B2
(45) Date of Patent: Jul. 17, 2018

(54) AUTOMATED ON DEMAND BAKING SYSTEM

(71) Applicant: GENIE ENTERPRISE LTD., Rishpon (IL)

(72) Inventors: Doron Marco, Tel Aviv (IL); Ayelet Carasso, Tel Aviv (IL)

(73) Assignee: Genie Enterprise Ltd., Rishpon (IL)

( * ) Notice: Subject to any disclaimer, the term of this patent is extended or adjusted under 35 U.S.C. 154(b) by 821 days.

(21) Appl. No.: 14/208,670

(22) Filed: Mar. 13, 2014

(65) Prior Publication Data

US 2015/0230657 A1    Aug. 20, 2015

Related U.S. Application Data

(60) Provisional application No. 61/940,516, filed on Feb. 17, 2014.

(51) Int. Cl.
*A21D 10/00* (2006.01)
*A47J 37/01* (2006.01)
(Continued)

(52) U.S. Cl.
CPC ............ *A47J 37/015* (2013.01); *A21B 7/005* (2013.01); *A21C 9/00* (2013.01); *A21D 8/02* (2013.01);
(Continued)

(58) Field of Classification Search
CPC ...... A47J 37/015; A47J 36/027; A47J 37/041; A47J 37/0629; A47J 37/0664; A47J 43/04;
(Continued)

(56) References Cited

U.S. PATENT DOCUMENTS 3,349,438 A    10/1967   Baker et al.
4,234,605 A    11/1980   Takeuchi
(Continued)

FOREIGN PATENT DOCUMENTS

CN    2080368 U    7/1991
GB    2477588 A    8/2011
(Continued)

OTHER PUBLICATIONS

"Great Baking Starts with a Great Miixer" Feb. 27, 2013 https://web.archive.org/web/20130227005949/http://www.thebakerynetwork.com/great-baking-starts-great-mixer.*
(Continued)

*Primary Examiner* — Katherine D Leblanc
(74) *Attorney, Agent, or Firm* — Sughrue Mion, PLLC (57) ABSTRACT

An automated, on-demand baking system including a computer controllable injector configured to be operative to programmably inject liquid baking ingredients through a wall of and into a mixing, baking and dispensing container, a computer controllable rotator configured to be operative to programmably rotate the mixing, baking and dispensing container containing baking ingredients, thereby mixing the baking ingredients into a dough, a heating generator operative to cause baking of the dough in the mixing, baking and dispensing container and a controller operative to govern the operation of the computer controllable injector, the computer controllable rotator and the heating generator.

12 Claims, 10 Drawing Sheets

(51) Int. Cl.
  *B65D 25/20* (2006.01)
  *B65D 81/34* (2006.01)
  *B65D 85/72* (2006.01)
  *A47J 36/02* (2006.01)
  *A47J 37/04* (2006.01)
  *A47J 37/06* (2006.01)
  *A47J 43/04* (2006.01)
  *A47J 43/07* (2006.01)
  *A47J 47/04* (2006.01)
  *A21C 9/00* (2006.01)
  *A21D 8/02* (2006.01)
  *A21B 7/00* (2006.01)

(52) U.S. Cl.
  CPC .......... *A47J 36/027* (2013.01); *A47J 37/041* (2013.01); *A47J 37/0629* (2013.01); *A47J 37/0664* (2013.01); *A47J 43/04* (2013.01); *A47J 43/0727* (2013.01); *A47J 47/04* (2013.01); *B65D 25/20* (2013.01); *B65D 81/3446* (2013.01); *B65D 85/72* (2013.01); *B65D 2581/3481* (2013.01); *B65D 2581/3485* (2013.01)

(58) Field of Classification Search
  CPC ......... A47J 43/0727; A47J 47/04; A21C 9/00; A21D 8/02
  See application file for complete search history.

(56) References Cited

U.S. PATENT DOCUMENTS

| | | | |
|---|---|---|---|
| 4,538,509 A | 9/1985 | Ojima et al. | |
| 4,649,810 A | 3/1987 | Wong | |
| 4,747,690 A | 5/1988 | Hayashi | |
| 5,233,144 A | 8/1993 | Morino et al. | |
| 5,498,074 A | 3/1996 | Moeller et al. | |
| 6,582,743 B2 | 6/2003 | Cai | |
| 2003/0041745 A1 | 3/2003 | Laflamme | |
| 2011/0117259 A1 | 5/2011 | Storek et al. | |
| 2011/0195162 A1 | 8/2011 | Wen et al. | |
| 2011/0244108 A1 | 10/2011 | Rabin | |
| 2014/0023768 A1 | 1/2014 | Waldner | |
| 2014/0076167 A1 | 3/2014 | Boggavarapu | |
| 2014/0093625 A1* | 4/2014 | Beck | B65D 65/463 426/138 |
| 2015/0079237 A1 | 3/2015 | Gamay et al. | |
| 2016/0058065 A1 | 3/2016 | Mantry et al. | |
| 2016/0288990 A1 | 10/2016 | Roberts et al. | |

FOREIGN PATENT DOCUMENTS

| | | |
|---|---|---|
| JP | 01-195819 A | 8/1989 |
| JP | 2006-255071 A | 9/2006 |
| JP | 2013-253724 A | 12/2013 |
| WO | 2015/121871 A1 | 8/2015 |

OTHER PUBLICATIONS

An International Search Report and a Written Opinion both dated Jun. 11, 2015, which issued during the prosecution of Applicant's PCT/IL15/50182.
U.S. Appl. No. 61/940,516, filed Feb. 17, 2014.
An Invitation to pay additional fees dated May 24, 2017, which issued during the prosecution of Applicant's PCT/IL2017/050195.
An Office Action dated Aug. 10, 2017 which issued during the prosecution of Singapore Patent Application No. 11201616717W.
European Search Report dated Oct. 10, 2017, which issued during the prosecution of Applicant's European App No. 15748610.1.
An International Search Report and a Written Opinion both dated Jul. 31, 2017, which issued during the prosecution of Applicant's PCT/IL2017/050195.
An Office Action dated Jan. 12, 2018, which issued during the prosecution of Australian Patent Application No. 2015216581.

* cited by examiner

AUTOMATED ON DEMAND BAKING SYSTEM

REFERENCE TO RELATED APPLICATIONS

Reference is hereby made to U.S. Provisional patent application Ser. No. 61/940,516, filed Feb. 17, 2014 and entitled "Food Creator," the disclosure of which is hereby incorporated by reference and priority of which is hereby claimed pursuant to 37 CFR 1.78(a)(4) and (5)(*i*).

FIELD OF THE INVENTION

The present invention relates to automated food preparation and more particularly to automated on-demand baking.

BACKGROUND OF THE INVENTION

There are known various devices for automated on-demand baking.

SUMMARY OF THE INVENTION

The present invention seeks to provide a highly efficient and cost-effective system for automated on-demand baking.

There is thus provided in accordance with a preferred embodiment of the present invention an automated, on-demand baking system including a computer controllable injector configured to be operative to programmably inject liquid baking ingredients through a wall of and into a mixing, baking and dispensing container, a computer controllable rotator configured to be operative to programmably rotate the mixing, baking and dispensing container containing baking ingredients, thereby mixing the baking ingredients into a dough, a heating generator operative to cause baking of the dough in the mixing, baking and dispensing container and a controller operative to govern the operation of the computer controllable injector, the computer controllable rotator and the heating generator.

Preferably, the computer controllable rotator includes a rotating drive motor and a drive shaft coupled to a container support and the computer controllable injector injects the liquid baking ingredients along an injection pathway that is generally coaxial with the drive shaft.

In accordance with a preferred embodiment of the present invention the computer controllable rotator includes a rotating drive motor and a drive shaft coupled to a container support and the computer controllable injector injects the liquid baking ingredients along an injection pathway that lies above the drive shaft.

Preferably, the controller is associated with a container recognition subsystem and is operative to permit operation of at least one of the computer controllable rotator and the computer controllable injector only when a recognized container is in operative engagement with the computer controllable injector.

There is also provided in accordance with another preferred embodiment of the present invention an automated, on-demand baking method including providing dry baking ingredients in a mixing, baking and dispensing container, inserting liquid baking ingredients into the mixing, baking and selling container through a needle which penetrates the mixing, baking and dispensing container, mixing the liquid baking ingredients and the dry baking ingredients into a dough in the mixing, baking and dispensing container, baking the dough in the mixing, baking and dispensing container to produce an edible baked product; and thereafter dispensing the edible baked product in the mixing, baking and dispensing container.

Preferably, the providing dry baking ingredients in a mixing, baking and dispensing container includes supplying the dry baking ingredients from a single unit storage container to the mixing, baking and dispensing container. Alternatively, the providing dry baking ingredients in a mixing, baking and dispensing container includes storing the dry baking ingredients in the mixing, baking and dispensing container.

In accordance with a preferred embodiment of the present invention the inserting liquid baking ingredients into the mixing, baking and selling container through a needle which penetrates the mixing, baking and dispensing container employs a needle which initially penetrates a wall of the mixing, baking and dispensing container, thereafter injects the liquid baking ingredients into the container and thereafter is withdrawn from the container. Additionally, the inserting liquid baking ingredients into the mixing, baking and selling container through a needle which penetrates the mixing, baking and dispensing container employs a needle which initially penetrates a wall of the mixing, baking and dispensing container, thereafter injects the liquid baking ingredients into the container at a location in the container located above the dry ingredients and in which the dry ingredients are not currently present and thereafter is withdrawn from the container.

Preferably, the mixing the liquid baking ingredients and the dry baking ingredients into a dough in the mixing, baking and dispensing container includes an initial stage in which the liquid baking ingredients and the dry baking ingredients are mixed when they are both located below the location in the container at which the needle penetrated the container. Additionally, the mixing the liquid baking ingredients and the dry baking ingredients into a dough in the mixing, baking and dispensing container includes a further stage at which the dough is initially formed and generally flowable liquid baking ingredients are no longer present in the mixing, baking and dispensing container and the dough is no longer always below the location in the container at which the needle penetrated the container.

There is further provided in accordance with yet another preferred embodiment of the present invention a mixing, baking and dispensing container for use with an automated, on-demand baking system or in an automated, on-demand baking method, the container including an injectable baking volume defining enclosure.

Preferably, the mixing, baking and dispensing container also includes a machine recognizable feature for providing an indication of genuineness. Additionally or alternatively, the mixing, baking and dispensing container according also includes an engagement portion on an outside of container enabling the container to be securely engaged by a rotator through 360 degree rotation.

In accordance with a preferred embodiment of the present invention the container is formed of a material including a material which is readily microwave heatable, whereby application of microwave energy to the container causes the container to be heated sufficiently to bake dough located therewithin. Additionally, the microwave heatable material includes at least one of silicon carbide and dense rubber urethane.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
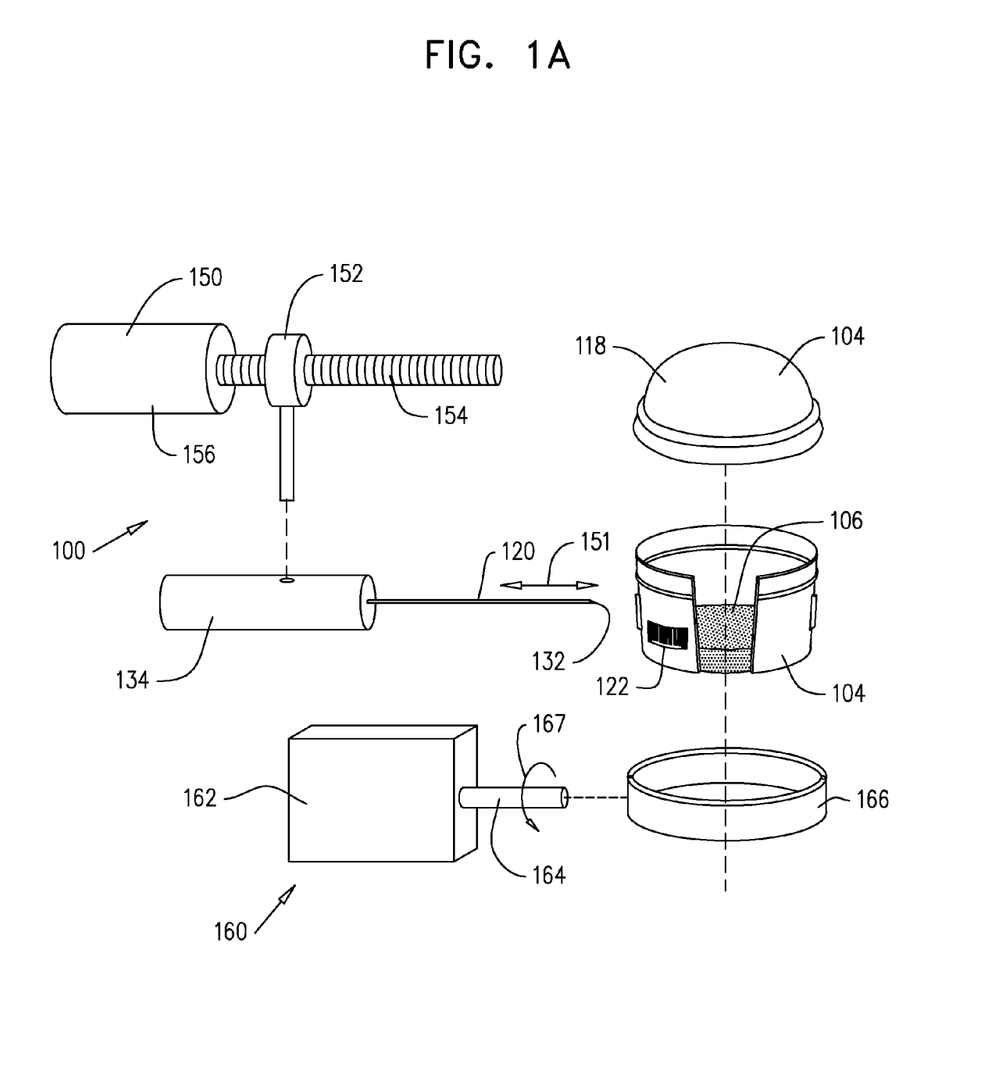
FIG. 1A is a simplified exploded view illustration of an automated, on-demand baking system constructed and operative in accordance with a preferred embodiment of the present invention.
Figure 1B:
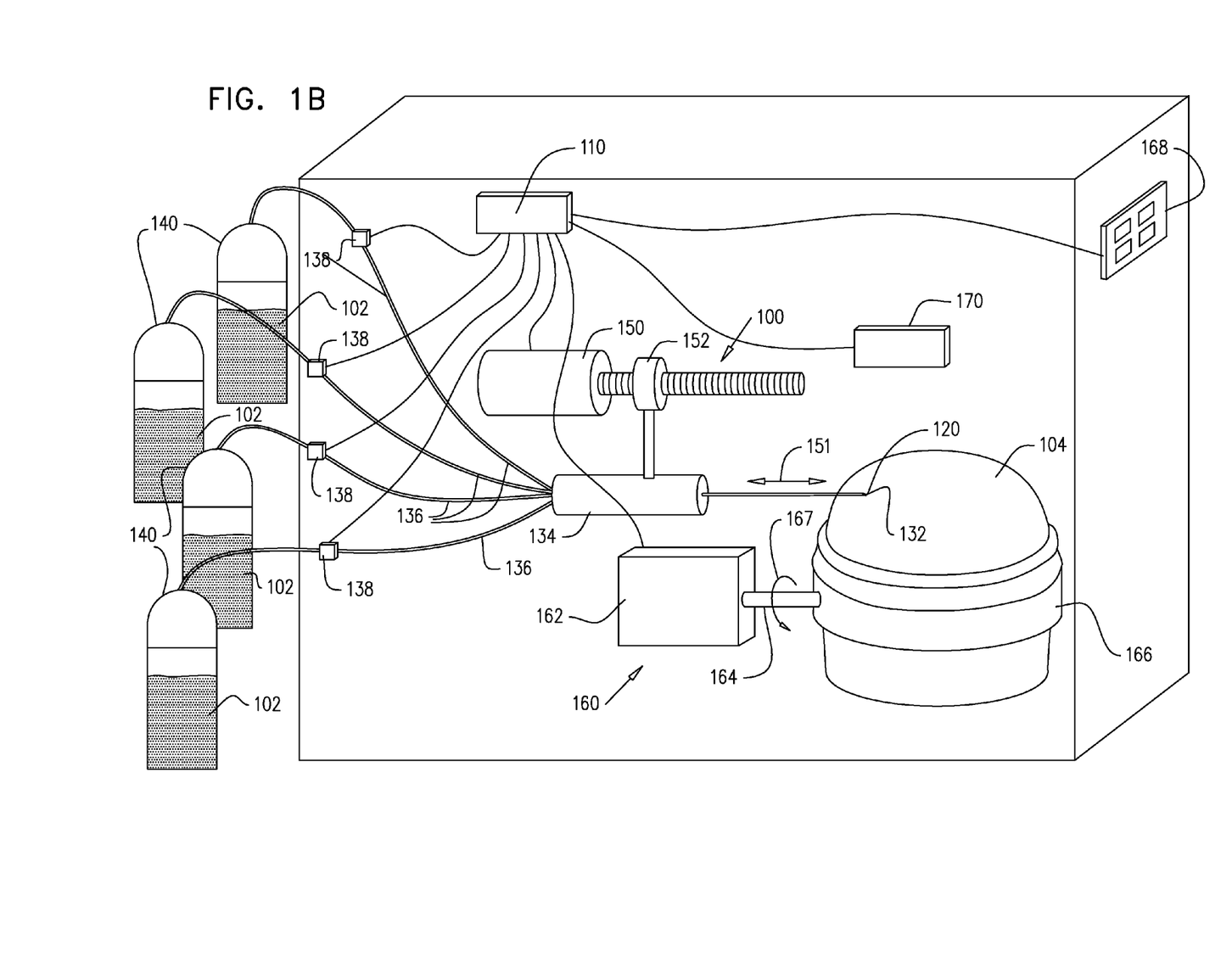
FIG. 1B is a simplified assembled view illustration of an automated, on-demand baking system constructed and operative in accordance with a preferred embodiment of the present invention.

Reference is now made to FIG. 1A, which is a simplified exploded view illustration of an automated, on-demand baking system constructed and operative in accordance with a preferred embodiment of the present invention, and to FIG. 1B, which is a simplified assembled view illustration of an automated, on-demand baking system constructed and operative in accordance with a preferred embodiment of the present invention.

As seen in FIGS. 1A and 1B, there is provided an automated, on-demand baking system including a controllable injector subsystem 100, which is configured to be operative to programmably inject liquid baking ingredients 102, such as water, cooking oil, milk and liquid flavors, into a mixing, baking and dispensing container 104, already containing dry baking ingredients 106, such as flour, baking powder, flavors and fruit. The operation of controllable injector subsystem 100 is preferably governed by a controller 110.

The container 104 is preferably a paper or plastic container including at least one wall portion 118 which is readily injectable or otherwise puncturable by an injection needle 120, forming part of the controllable injector subsystem 100. Container 104 may be formed of two parts, as shown, or may be integrally formed as a single piece. It may be formed of a single material, such as food grade formed polystyrene or polypropylene, or may be made of multiple materials. It may be preloaded with the dry baking ingredients 106, and thus serve for long term storage thereof, or, alternatively, may be loaded with the dry baking ingredients just before baking. In the latter alternative, the dry baking ingredients may be advantageously stored in single unit packages.

Further in accordance with a preferred embodiment of the invention, container 104 may be provided with a machine recognizable feature 122, such as one or more of a barcode, an RF ID tag, visual indicia or three-dimensional feature for providing an indication of genuineness of the container and its contents. It is appreciated that controller 110 may be operative to permit operation of the injector subsystem 100 only upon receipt of the indication of genuineness of the container and its contents.

Preferably, container 104 is formed with an engagement portion 130 on an outside surface thereof, which enables the container to be securely engaged by a rotator through 360 degree rotation. The engagement portion may comprise one or more protrusions or recesses which correspond with cooperating recesses or protrusions on a portion of the rotator which holds the container during mixing.

In accordance with a preferred embodiment of the present invention, container 104 may be formed of a material which is readily microwave heatable, whereby application of microwave energy to container 104 causes container 104 to be heated sufficiently to bake dough located therewithin. Examples of such a microwave heatable material include silicon carbide and dense rubber urethane.

Returning now to the description of the controllable injector subsystem 100, it is seen that injection needle 120 may be any suitable hollow needle, preferably of outer diameter of 2.5 mm and inner diameter of 1.5 mm and having a pointed tip 132. The injection needle 120 defines a liquid baking ingredients passageway that communicates with an input manifold 134 to which may be connected plural liquid baking ingredient supply tubes 136, each coupled, via a suitable controllable pump 138, to a liquid baking ingredient supply container 140.

As seen in FIGS. 1A and 1B, the injection needle 120 is preferably axially displaceably mounted onto a linear displacer 150, which moves injection needle in a linear direction as indicated by arrow 151, such as a nut 152 rotatably and linearly displaceably engaging a threaded output shaft 154 of a rotary motor 156. It is appreciated that any other suitable linear displacer may be employed. The axially displaceable mounting of the injection needle 120 relative to the container 104 enables computer controlled injection of the liquid baking ingredients 102 into the interior of container 104, preferably by retractable penetration of at least one wall portion 118 of container 104 by the pointed tip 132 of injection needle 120. Preferably, in this embodiment of the present invention, injection needle 120 is retracted out of engagement with container 104 following injection of liquid baking ingredients 102 and prior to baking. More preferably, the injection needle 120 is flushed with water prior to retraction and retraction takes place prior to dough formation by rotation of the container 104.

In accordance with a preferred embodiment of the present invention, the liquid baking ingredients 102 are injected into the container 104 at a height in the container 104 which is above the top level of the dry baking ingredients 106 therein, thereby allowing the liquid baking ingredients 102 to fall by gravity onto and into the dry baking ingredients 106.

The automated, on-demand baking system of a preferred embodiment of the present invention also preferably comprises a controllable rotator subassembly 160, configured to be operative to programmably rotate mixing, baking and dispensing container 104 containing liquid baking ingredients 102 and dry baking ingredients 106, thereby mixing the baking ingredients 102 and 106 into a dough.

The controllable rotator subassembly 160 preferably includes a computer-controllable rotary motor 162, such as a stepper motor, having an output shaft 164 which is coupled to or integrally formed with a container engagement element 166, such as a ring, which completely or partially surrounds the container 104 and releasably retains container 104 in engagement therewith during rotation thereof, including 360 degree rotation in a vertical plane. The container engagement element 166 preferably includes one or more protrusions or sockets which enable it to reliably retain a container having corresponding sockets or protrusions, such as container 104, during rotation thereof, including 360 degree rotation in a vertical plane.

In an alternative embodiment of the present invention, injector needle 120 and input manifold 134 may define an injection pathway coaxial with output shaft 164. In this embodiment, output shaft 164 is a hollow output shaft into which injector needle 120 is inserted and container engagement element 166 is formed with an aperture through which injector needle 120 injects liquid baking ingredients 102.

The controllable rotator subassembly 160 is preferably also controlled by controller 110 and is preferably operative to mix the liquid baking ingredients 102 and the dry baking ingredients 106 by back and forth rotating motion of container engagement element 166 about an axis of output shaft 164, as indicated by arrow 167. Preferably, controller 110 causes the controllable rotator subassembly 160 to initially rotate the container with a small amplitude such as +/−20 degrees about the vertical axis and thereafter, increase the amplitude in stages to +/−180 degrees and thereafter to a continuous 360 degree rotation in the vertical plane. The result of the mixing is formation of dough within the container 104 to the exclusion of unmixed baking ingredients.

It is appreciated that controller 110 may be operative to permit operation of the rotator subassembly 160 only upon receipt of the indication of genuineness of the container and its contents.

It is noted that leakage of liquid baking ingredients 102 from container 104 through an aperture formed in wall portion 118, preferably a side wall, of the container 104 by penetration thereof by injection needle 120 and subsequent retraction of the injection needle 120 from the wall portion 118 of the container 104 does not occur for at least one of the following reasons:

the liquid baking ingredients 102 are relatively quickly absorbed into the dry baking ingredients 106, typically within 5-10 seconds of injection;

during the time immediately following injection, typically 5-10 seconds, the amplitude of rotation of the container 104 is such that any free liquid does not reach the height of the location of the injection aperture in the wall portion 118 of the container 104; and the centrifugal force of rotation in the vertical plane forces all of the baking ingredients, including any free, unabsorbed liquids, outwardly along a vertical direction rather than sideways.

Preferably, the controller 110 causes the controllable rotator subassembly 160 to operate in accordance with a predetermined mixing protocol. The predetermined mixing protocol may be selected by a user, via an input device 168, from one or more preprogrammed mixing protocols, or may be input by the user to controller 110 via input device 168. It is appreciated that the predetermined mixing protocol is typically a function of the ingredients being mixed and the baked product being produced. One preferred mixing protocol is described hereinbelow with referenced to FIGS. 2E-2G.

The automated, on-demand baking system of a preferred embodiment of the present invention additionally preferably comprises a heating generator 170 operative to cause baking of the dough in the mixing, baking and dispensing container 104.

As noted above, controller 110 is operative to govern the operation of the controllable injector subsystem 100, the controllable rotator subassembly 160 and the heating generator 170. A preferred injection, mixing and heating protocol is set forth hereinbelow and is explained with reference to FIGS. 2A-2H.

Reference is now made to FIGS. 2A-2H, which are simplified illustrations of various stages in the operation of the automated, on-demand baking system of FIG. 1 according to one preferred injection, mixing and heating protocol.

Figure 2A:
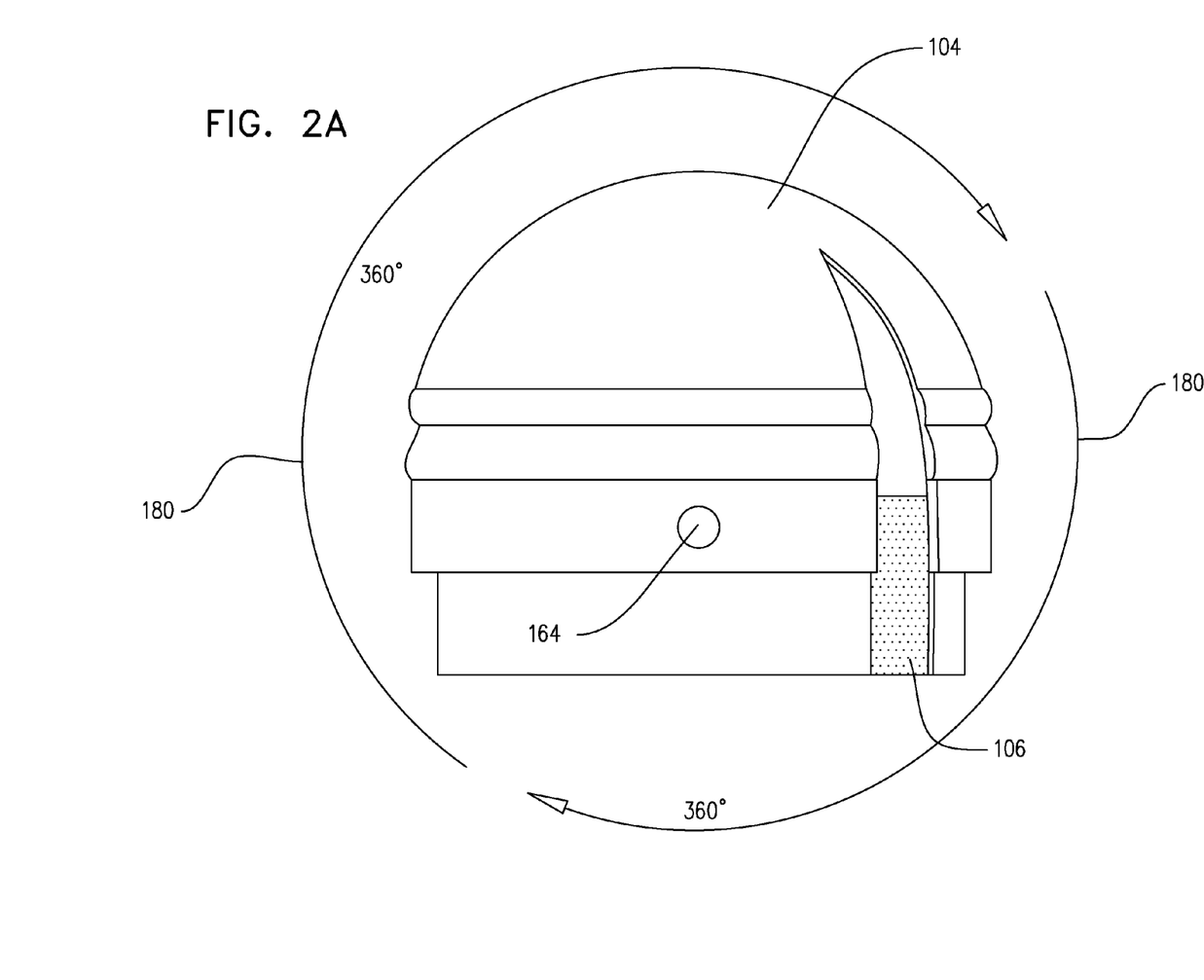
FIGS. 2A, 2B, 2C, 2D, 2E, 2F, 2G and 2H are simplified illustrations of various stages in the operation of the automated, on-demand baking system of FIG. 1.

As seen in FIG. 2A, container 104, including dry baking ingredients 106 is preferably rotated, as indicated by arrow 180, 3 complete rotations in a continuous 360° rotation in the vertical plane. The 3 rotations typically take a total time of 3 seconds. It is appreciated that the rotation of the dry baking ingredients may be achieved by rotating output shaft 164 in either a clockwise or a counterclockwise direction.

Figure 2B:
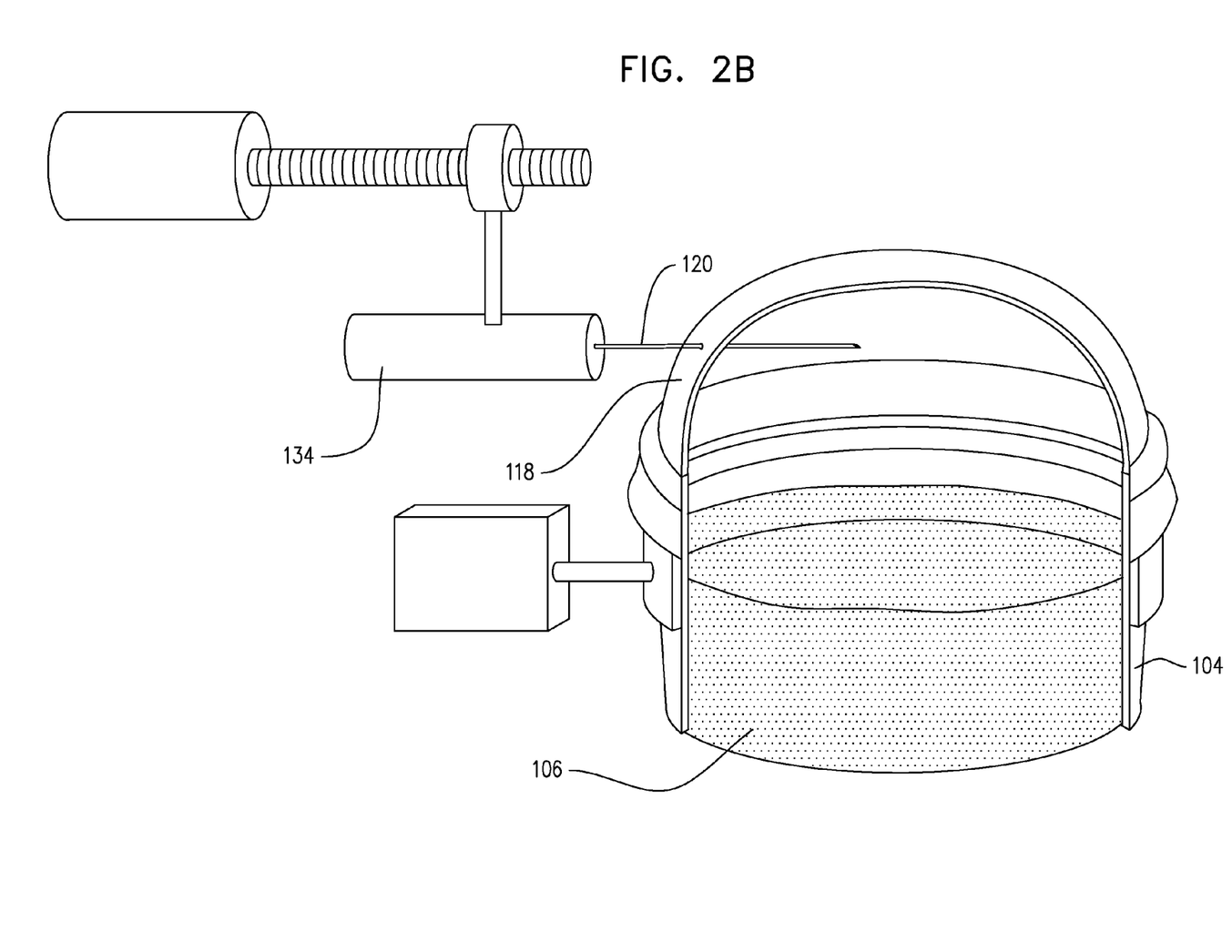

FIG. 2B shows the insertion of injection needle 120 into wall portion 118 of container 104, which typically takes 1 second.

Figure 2C:
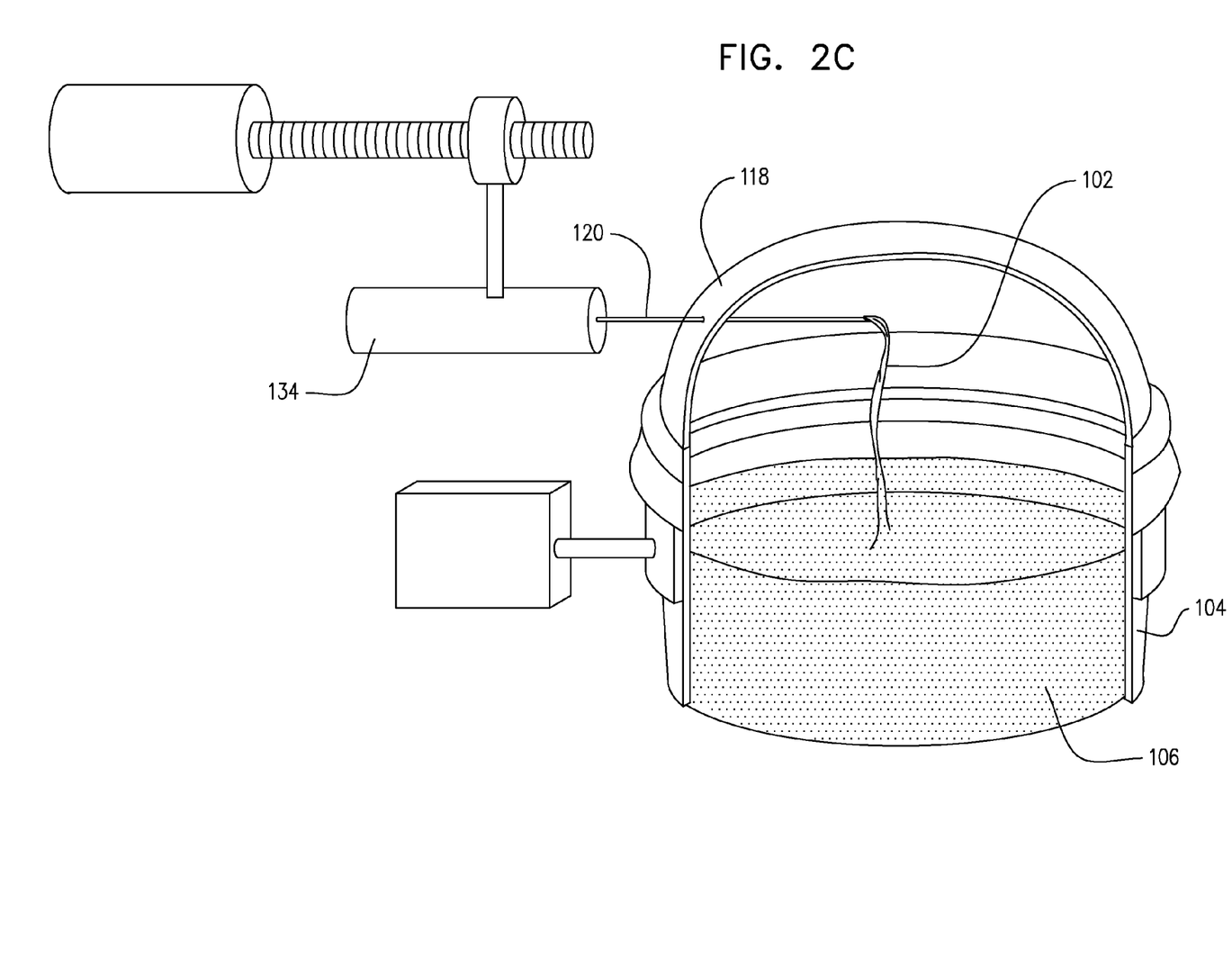

FIG. 2C shows the addition of liquid baking ingredients 102, via input manifold 134 and injection needle 120, to container 104, which typically takes a total of 3 seconds. As noted above, liquid baking ingredients 102 are preferably injected into container 104 at a height in container 104 which is above the top level of dry baking ingredients 106 therein, thereby allowing liquid baking ingredients 102 to fall by gravity onto and into dry baking ingredients 106.

Figure 2D:
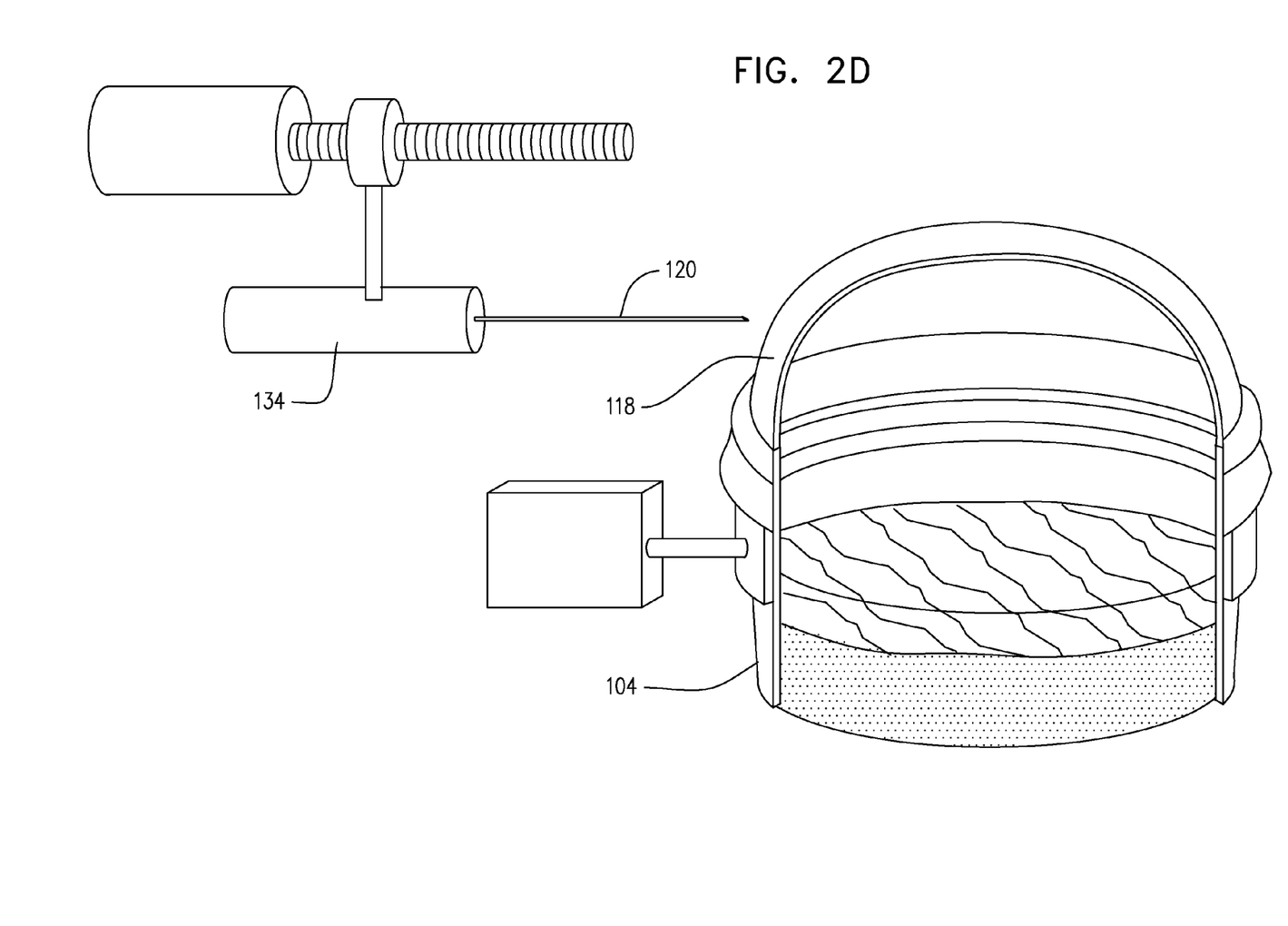

FIG. 2D shows retraction of injection needle 120 from wall portion 118 of container 104, which typically takes 1 second.

Figure 2E:
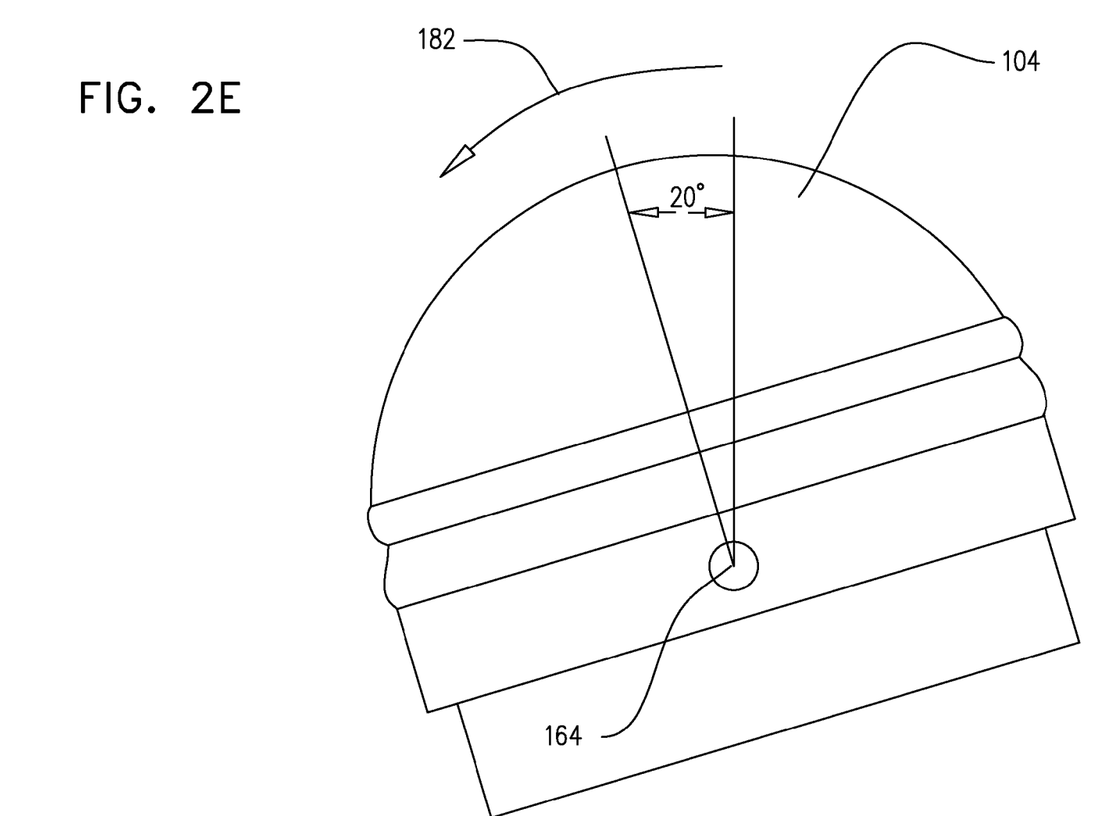

As seen in FIG. 2E, container 104 is then partially rotated counterclockwise, as indicated by arrow 182, in the sense of FIG. 2E, typically a 20° rotation, and then returned to the original horizontal position. This partial rotation is preferably repeated, typically 5 times, with each partial rotation typically taking 2 seconds.

Figure 2F:
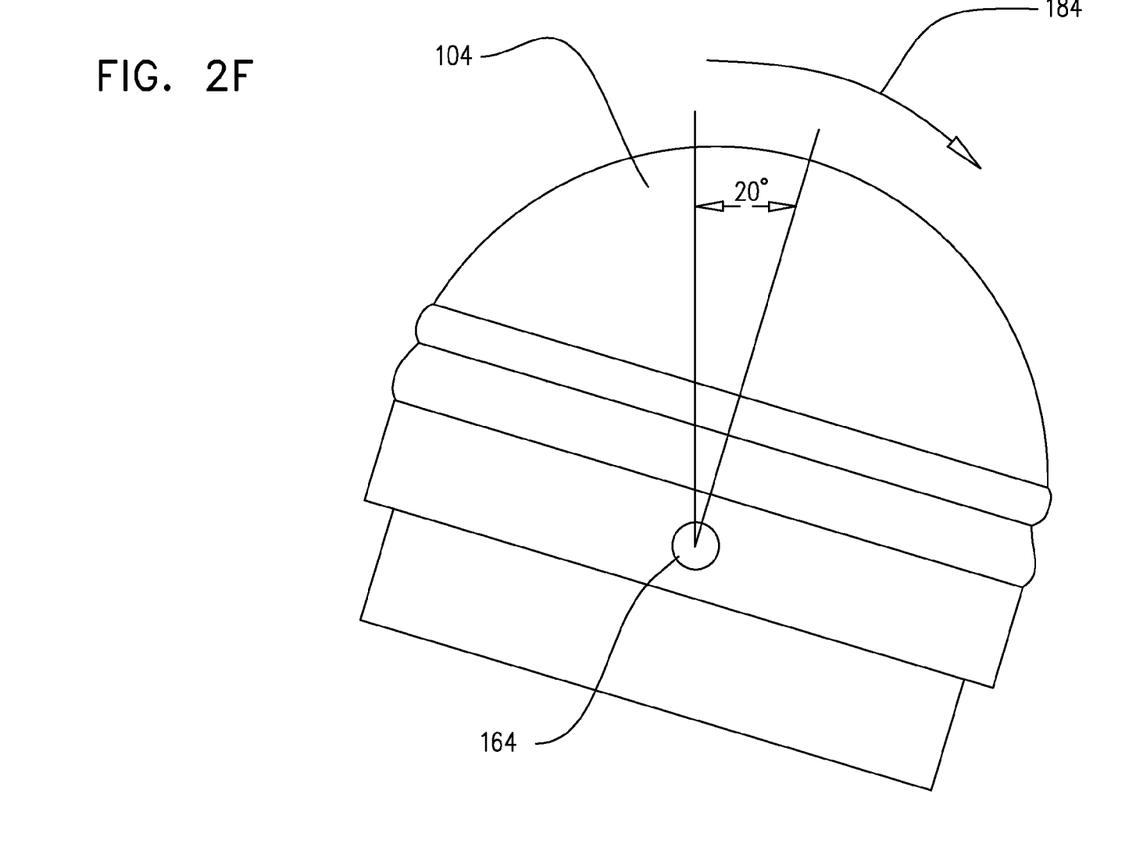

As seen in FIG. 2F, container 104 is then partially rotated clockwise, as indicated by arrow 184, in the sense of FIG. 2F, typically a 20° rotation, and then returned to the original horizontal position. This partial rotation is preferably repeated, typically 5 times, with each partial rotation typically taking 2 seconds.

Figure 2G:
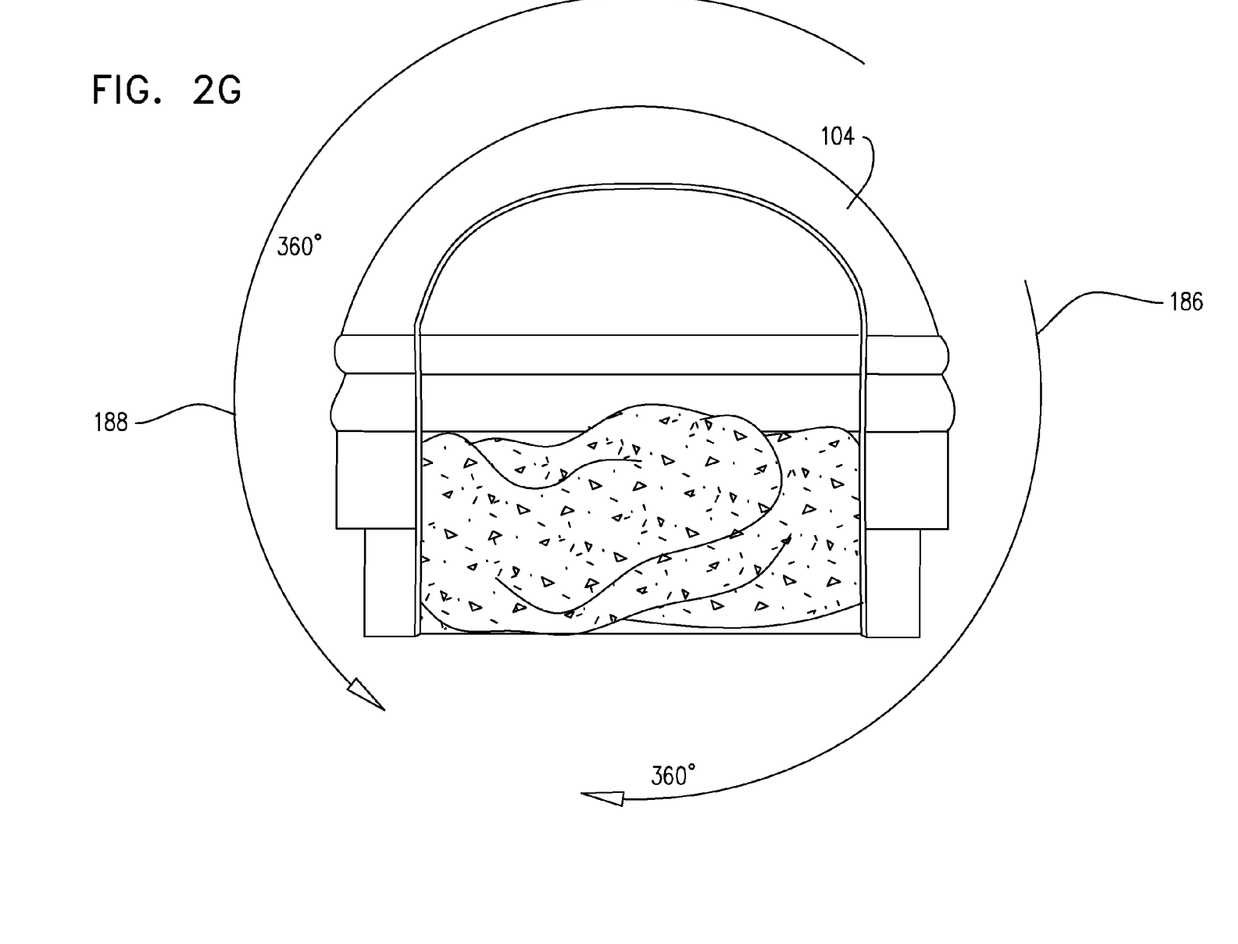

As seen in FIG. 2G, container 104 is then preferably rotated both clockwise, as indicated by arrow 186, and counterclockwise, as indicated by arrow 188, in the sense of FIG. 2G. The container is typically rotated 5 complete rotations in a continuous 360° rotation in the vertical plane in a first direction and then rotated 5 complete rotations in a continuous 360° rotation in the vertical plane in an opposite direction. Each of the 5 rotations in each direction typically takes 2 seconds.

This is preferably followed by rotating the container 3 complete rotations in a continuous 360° rotation in the vertical plane in the first direction and then 3 complete rotations in a continuous 360° rotation in the vertical plane in the opposite direction. Each of the 3 rotations in each direction typically takes 4 seconds.

As seen in FIG. 2G, the result of the mixing is formation of a dough within container 104 to the exclusion of unmixed baking ingredients.

Figure 2H:
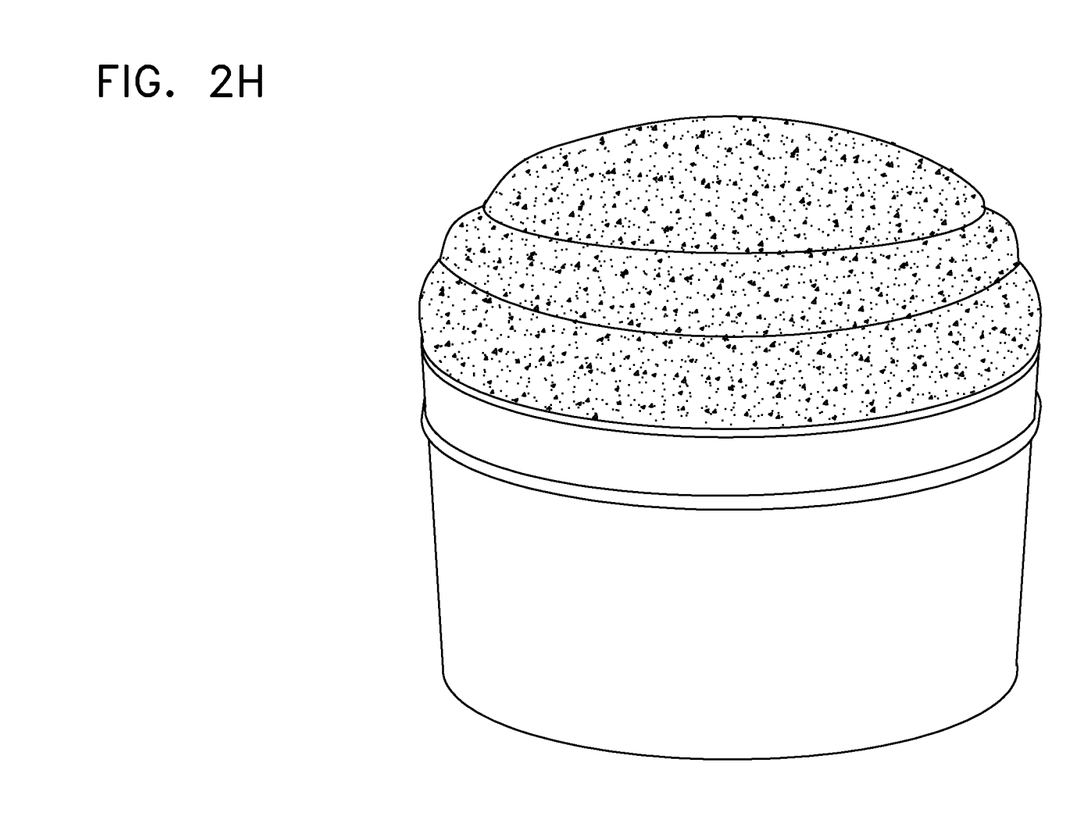

The mixing is preferably followed by a heating step, typically a microwave heating step. The heating step typically takes 30 seconds. As seen in FIG. 2H, the result is a baked product in container 104.

It will be appreciated by persons skilled in the art that the present invention is not limited to what has been particularly shown and described hereinabove. Rather the scope of the invention includes both combinations and subcombinations of the various features described hereinabove as well as modifications and variations thereof which would occur to persons skilled in the art upon reading the foregoing description and which are not in the prior art.

The invention claimed is:

1. An automated, on-demand baking method comprising:
   providing dry baking ingredients in a mixing, baking and dispensing container;
   inserting liquid baking ingredients into said mixing, baking and dispensing container;
   mixing said liquid baking ingredients and said dry baking ingredients into a dough in said mixing, baking and dispensing container, said mixing comprising rotating said mixing, baking and dispensing container containing said liquid baking ingredients and said dry baking ingredients in a vertical plane;

baking said dough in said mixing, baking and dispensing container to produce an edible baked product; and thereafter dispensing said edible baked product in said mixing, baking and dispensing container.

2. An automated, on-demand baking method according to claim 1 and wherein said providing dry baking ingredients in a mixing, baking and dispensing container includes supplying said dry baking ingredients from a single unit storage container to said mixing, baking and dispensing container.

3. An automated, on-demand baking method according to claim 1 and wherein said providing dry baking ingredients in a mixing, baking and dispensing container includes storing said dry baking ingredients in said mixing, baking and dispensing container.

4. An automated, on-demand baking method according to claim 1 and wherein said inserting liquid baking ingredients into said mixing, baking and dispensing container through a needle which penetrates said mixing, baking and dispensing container employs a needle which initially penetrates a wall of said mixing, baking and dispensing container, thereafter injects said liquid baking ingredients into said container and thereafter is withdrawn from said container.

5. An automated, on-demand baking method according to claim 1 and wherein said inserting liquid baking ingredients into said mixing, baking and dispensing container through a needle which penetrates said mixing, baking and dispensing container employs a needle which initially penetrates a wall of said mixing, baking and dispensing container, thereafter injects said liquid baking ingredients into said container at a location in said container located above said dry ingredients and in which said dry ingredients are not currently present and thereafter is withdrawn from said container.

6. An automated, on-demand baking method according to claim 5 and wherein said mixing said liquid baking ingredients and said dry baking ingredients into a dough in said mixing, baking and dispensing container includes an initial stage in which said liquid baking ingredients and said dry baking ingredients are mixed when they are both located below said location in said container at which said needle penetrated said container.

7. An automated, on-demand baking method according to claim 6 and wherein said mixing said liquid baking ingredients and said dry baking ingredients into a dough in said mixing, baking and dispensing container includes a further stage at which said dough is initially formed and generally flowable liquid baking ingredients are no longer present in said mixing, baking and dispensing container and said dough is no longer always below said location in said container at which said needle penetrated said container.

8. An automated, on-demand baking method according to claim 1 and wherein said inserting liquid baking ingredients comprises inserting liquid baking ingredients into said mixing, baking and dispensing container through a needle which penetrates said mixing, baking and dispensing container.

9. An automated, on-demand baking method according to claim 1 and wherein said rotating said mixing, baking and dispensing container containing said liquid baking ingredients and said dry baking ingredients in a vertical plane comprises 360° rotation in a vertical plane.

10. An automated, on-demand baking method according to claim 1 and wherein said rotating said mixing, baking and dispensing container containing said liquid baking ingredients and said dry baking ingredients in a vertical plane comprises continuous 360° rotation in a vertical plane.

11. An automated, on-demand baking method according to claim 1 and wherein said rotating said mixing, baking and dispensing container containing said liquid baking ingredients and said dry baking ingredients comprises back and forth rotation.

12. An automated, on-demand baking method according to claim 1 and wherein said rotating said mixing, baking and dispensing container containing said liquid baking ingredients and said dry baking ingredients comprises rotation at a first amplitude followed by rotation at at least one second amplitude greater than said first amplitude.

* * * * *